(12) United States Patent
Rogenmoser et al.

(10) Patent No.: US 6,941,334 B2
(45) Date of Patent: *Sep. 6, 2005

(54) HIGHER PRECISION DIVIDE AND SQUARE ROOT APPROXIMATIONS

(75) Inventors: Robert Rogenmoser, Santa Clara, CA (US); Michael C. Kim, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 599 days.

This patent is subject to a terminal disclaimer.

(21) Appl. No.: 10/062,378

(22) Filed: Feb. 1, 2002

(65) Prior Publication Data

US 2003/0149712 A1 Aug. 7, 2003

(51) Int. Cl.⁷ .................................. G06F 7/38
(52) U.S. Cl. .................. 708/502; 708/504; 708/605
(58) Field of Search .......................... 708/501, 502, 708/504, 605, 654, 270

(56) References Cited

U.S. PATENT DOCUMENTS

| | | | | |
|---|---|---|---|---|
| 3,648,038 A | * | 3/1972 | Sierra ........................ | 708/654 |
| 4,725,974 A | * | 2/1988 | Kanazawa .................. | 708/654 |
| 5,293,558 A | * | 3/1994 | Narita et al. ............... | 708/605 |
| 5,307,302 A | * | 4/1994 | Nakano ...................... | 708/605 |
| 6,134,574 A | | 10/2000 | Oberman | |

OTHER PUBLICATIONS

SiByte, "Target Applications," http://sibyte.com/mercurian/applications.htm, Jan. 15, 2001, 2 pages.
SiByte, "SiByte Technology," http://sibyte.com/mercurian/technology.htm, Jan. 15, 2001, 3 pages.
SiByte, "The Mercurian Processor," http://sibyte.com/mercurian, Jan. 15, 2001, 2 pages.
SiByte, "Fact Sheet," SB–1 CPU, Oct. 2000, rev. 0.1, 1 page.
SiByte, "Fact Sheet," SB–1250, Oct. 2000, rev. 0.2, 10 pages.
Stepanian, SiByte, SiByte SB–1 MIPS64 CPU Core, Embedded Processor Forum 2000, Jun. 13, 2000, 15 pages.
Jim Keller, "The Mercurian Processor: A High Performance, Power–Efficient CMP for Networking," Oct. 10, 2000, 22 pages.
Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.
SiByte, Letter from Anu Sundaresan, May 18, 2000, 1 page.
The Newton–Raphson Method, Mohamed A. Khamsi and Helmut Knaust, MethMedics, LLC. 1999–2002, 5 pages.
"Computer Architecture A Quantitative Approach," Second Edition, Patterson and Hennessy, 1990/1996 Morgan Kaufmann Publishers, Inc., pp. A–3 to A–10, A–17 to A–32.

* cited by examiner

*Primary Examiner*—Chuong D. Ngo
(74) *Attorney, Agent, or Firm*—Garlick Harrison & Markison LLP

(57) ABSTRACT

A floating point unit includes a multiplier, an approximation circuit, and a control circuit coupled to the multiplier and the approximation circuit. The approximation circuit is configured to generate an approximation of a difference of the first result from the multiplier and a constant. The control circuit is configured to approximate a function specified by a floating point instruction provided to the floating point unit for execution using an approximation algorithm. The approximation algorithm comprises at least two iterations through the multiplier and optionally the approximation circuit. The control circuit is configured to correct the approximation from the approximation circuit from a first iteration of the approximation algorithm during a second iteration of the approximation algorithm by supplying a correction vector to the multiplier during the second iteration. The multiplier is configured to incorporate the correction vector into the first result during the second iteration.

23 Claims, 8 Drawing Sheets

| State | Operand Mux 62 | Operand Mux 64 | Output Mux 66 | Rounding Vector |
|---|---|---|---|---|
| Idle | -- | -- | -- | -- |
| Initial Approx. | -- | -- | -- | -- |
| Compute $2-AX_i$ | Input Operand or Register | Approx. or Result | Approx. Circuit | Round to Nearest |
| Compute $X_i(2-AX_i)$ | Result | Register | Multiplier | Correction Vector + Round to Nearest |

FIG. 5

| State | Operand Mux 62 | Operand Mux 64 | Output Mux 66 | Rounding Vector |
|---|---|---|---|---|
| Idle | -- | -- | -- | -- |
| Initial Approx. | -- | -- | -- | -- |
| Compute $AX_i$ | Input Operand or Register | Approx. or Result | Multiplier | Round to Nearest |
| Compute $(3-X_i(AX_i))/2$ | Result | Register | Approx. Circuit | Round to Nearest |
| Compute $X_i(3-X_i(AX_i))/2$ | Result | Register | Multiplier | Correction Vector + Round to Nearest |

FIG. 7

HIGHER PRECISION DIVIDE AND SQUARE ROOT APPROXIMATIONS

BACKGROUND OF THE INVENTION

1. Field of the Invention

This invention is related to floating point execution units in processors and, more particularly, to approximations in floating point calculations.

2. Description of the Related Art

In floating point units of processors, approximation hardware is often used to approximate certain functions. For example, division, square root, and other functions are often approximated. Various approximation algorithms exist. For example, the Newton-Raphson or Goldschmidt algorithms are popular.

As with other operations (such as addition, subtraction, or multiplication) which may be calculated using hardware designed to perform the operation directly (e.g. adders, multipliers, etc.), the approximation hardware is designed to meet the requirements of the widely accepted floating point standards. One such standard is the Institute for Electrical and Electronic Engineers (IEEE) standard 754 (and related standards and updates). The IEEE 754 standard specifies floating point arithmetic for several precisions, including single precision and double precision. Single precision numbers are represented by a 32 bit quantity which includes 1 bit of sign, 8 bits of exponent, and 23 bits of significand. An implied one to the left of the binary point brings the precision of the significand to 24 bits. Double precision numbers are represented by a 64 bit quantity which includes one bit of sign, 11 bits of exponent, and 52 bits of significand. Again, the implied one brings the precision of the significand to 53 bits.

The IEEE 754 specification requires that any floating point result be accurate (as compared to the exact mathematical result) within 0 to ½ of the least significant digit of the result. Results computed using approximation algorithms must meet this level of accuracy as well.

The approximation algorithms may often include subtractions which may themselves be approximated by inverting the value being subtracted (and a right or left shift may be necessary). By making use of this approximation, use of the adder in the floating point unit may be avoided. Additionally, the subtraction may be performed at the end of a multiplication which produces one of the operands for the subtraction (at least in some cases), thus reducing the number of iterations through the floating point hardware to perform the approximation. The subtraction approximation results in a value which is less than the actual result of the subtraction (the difference) by one unit in the last place. The error in the approximation may propagate, and may in some cases prevent the achievement of the 0 to ½ of the least significant bit of accuracy requirement of the IEEE 754 specification.

SUMMARY OF THE INVENTION

A floating point unit includes a multiplier configured to generate a first result, an approximation circuit coupled to receive the first result, and a control circuit coupled to the multiplier and the approximation circuit. The approximation circuit is configured to generate an approximation of a difference of the first result from a constant. The control circuit is configured to approximate a function specified by a floating point instruction provided to the floating point unit for execution using an approximation algorithm. The approximation algorithm comprises at least two iterations through the multiplier and optionally the approximation circuit. The control circuit is configured to correct the approximation from the approximation circuit from a first iteration of the approximation algorithm during a second iteration of the approximation algorithm by supplying a correction vector to the multiplier during the second iteration. The multiplier is configured to incorporate the correction vector into the first result during the second iteration. A carrier medium comprising one or more data structures representing the floating point unit is also contemplated.

A method is also contemplated. A function is approximated using an approximation algorithm. The approximation algorithm includes at least two iterations of: (i) a multiplication in a multiplier, and (ii) a difference approximation between a constant and a result of the multiplication. The difference approximation is less than a difference between the constant and the result by one unit in the least significant bit of the difference approximation. During a first of the iterations, the difference approximation is generated. During a second of the iterations, a correction vector is supplied to the multiplier. The multiplier incorporates the correction vector in the multiplication. The correction vector corrects the difference approximation.

BRIEF DESCRIPTION OF THE DRAWINGS

The following detailed description makes reference to the accompanying drawings, which are now briefly described.

FIG. 5 is a table illustrating certain operations of one embodiment of the control circuit for the states in the state machine shown in FIG. 4.

FIG. 7 is a table illustrating certain operations of one embodiment of the control circuit for the states in the state machine shown in FIG. 6.

Figure 1:
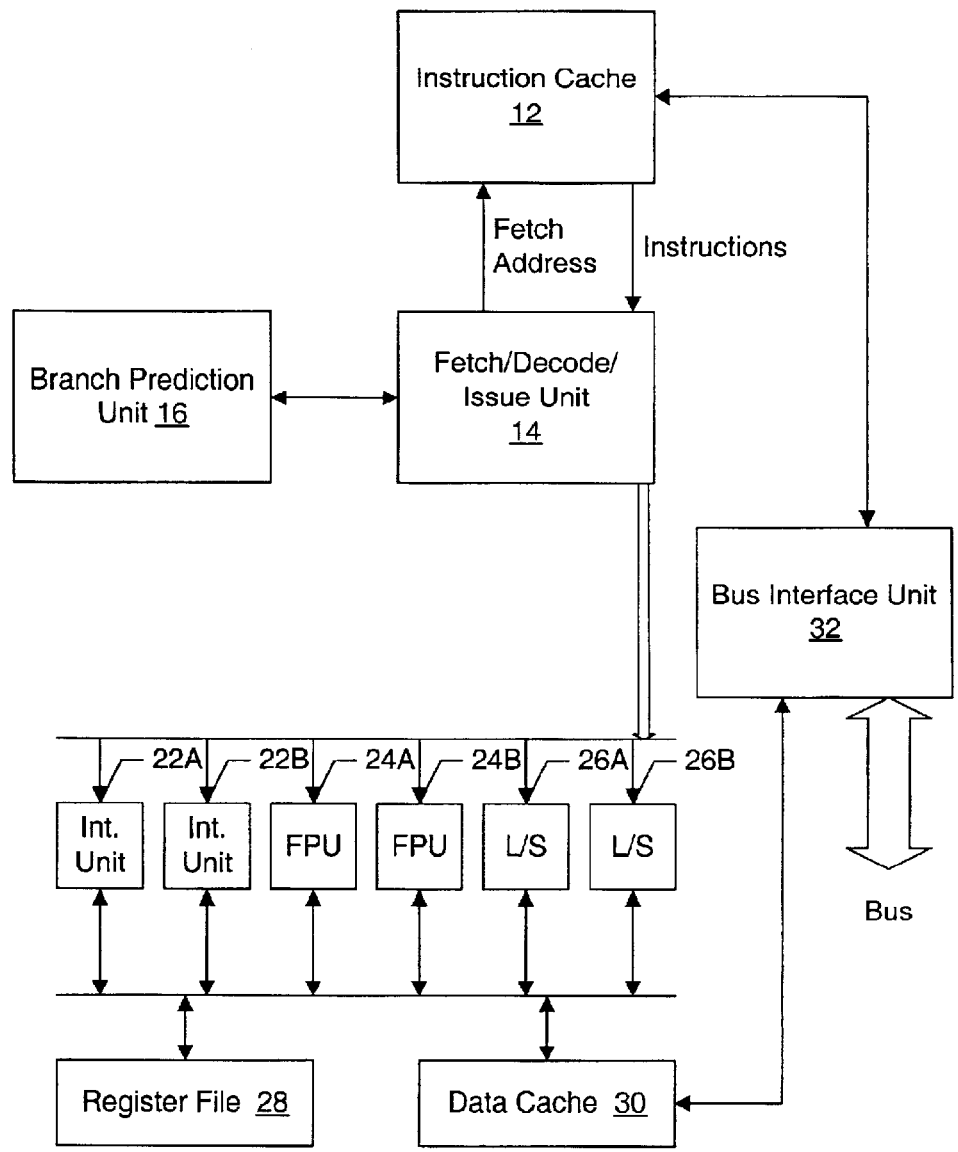
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

Turning now to FIG. 1, a block diagram of one embodiment of a processor 10 is shown. Other embodiments are possible and contemplated. In the embodiment of FIG. 1, the processor 10 includes an instruction cache 12, a fetch/decode/issue unit 14, a branch prediction unit 16, a set of integer execution units 22A–22B, a set of floating point execution units 24A–24B, a set of load/store execution units 26A–26B, a register file 28, a data cache 30, and a bus interface unit 32. The instruction cache 12 is coupled to the bus interface unit 32, and is coupled to receive a fetch address from, and provide corresponding instructions to, the fetch/decode/issue unit 14. The fetch/decode/issue unit 14 is further coupled to the branch prediction unit 16 and the execution units 22A–22B, 24A–24B, and 26A–26B. Specifically, the fetch/decode/issue unit 14 is coupled to provide a branch address to the branch prediction unit 16 and to receive a prediction and/or a target address from the branch prediction unit 16. The fetch/decode/issue unit 14 is coupled to provide instructions for execution to the execution units 22A–22B, 24A–24B, and 26A–26B. The execution units 22A–22B, 24A–24B, and 26A–26B are generally coupled to the register file 28 and the data cache 30, and the data cache 30 is coupled to the bus interface unit 32.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in one embodiment, the branch prediction unit 16 include an array of branch predictors indexed by the branch address (e.g. the typical two bit counters which are incremented when the corresponding branch is taken, saturating at 11 in binary, and decremented when the corresponding branch is not taken, saturating at 00 in binary, with the most significant bit indicating taken or not taken). While any size and configuration may be used, one implementation of the branch predictors 16 may be 4 k entries in a direct-mapped configuration. Additionally, in one embodiment, the branch prediction unit 16 may include a branch target buffer comprising an array of branch target addresses. The target addresses may be previously generated target addresses of any type of branch, or just those of indirect branches. Again, while any configuration may be used, one implementation may provide 64 entries in the branch target buffer. Still further, an embodiment may include a return stack used to store link addresses of branch instructions which update a link resource ("branch and link" instructions). The fetch/decode/issue unit 14 may provide link addresses when branch instructions which update the link register are fetched for pushing on the return stack, and the return stack may provide the address from the top entry of the return stack as a predicted return address. While any configuration may be used, one implementation may provide 8 entries in the return stack.

The fetch/decode/issue unit 14 decodes the fetched instructions and queues them in one or more issue queues for issue to the appropriate execution units. The instructions may be speculatively issued to the appropriate execution units, again prior to execution/resolution of the branch instructions which cause the instructions to be speculative. In some embodiments, out of order execution may be employed (e.g. instructions may be issued in a different order than the program order). In other embodiments, in order execution may be used. However, some speculative issue/execution may still occur between the time that a branch instruction is issued and its result is generated from the execution unit which executes that branch instruction (e.g. the execution unit may have more than one pipeline stage).

The integer execution units 22A–22B are generally capable of handling integer arithmetic/logic operations, shifts, rotates, etc. At least the integer execution unit 22A is configured to execute branch instructions, and in some embodiments both of the integer execution units 22A–22B may handle branch instructions. In one implementation, only the execution unit 22B executes integer multiply and divide instructions although both may handle such instructions in other embodiments. The floating point execution units 24A–241B similarly execute the floating point instructions. The integer and floating point execution units 22A–22B and 24A–24B may read and write operands to and from the register file 28 in the illustrated embodiment, which may include both integer and floating point registers. The load/store units 26A–26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any suitable configuration and size, including direct mapped, fully associative, and set associative configurations. Similarly, the data cache 30 may have any suitable configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

In one implementation, the processor 10 is designed to the MIPS instruction set architecture (including the MIPS-3D and MIPS MDMX application specific extensions). The MIPS instruction set may be used below as a specific example of certain instructions. However, other embodiments may implement the IA-32 or IA-64 instruction set architectures developed by Intel Corp., the PowerPC instruction set architecture, the Alpha instruction set architecture, the ARM instruction set architecture, or any other instruction set architecture.

It is noted that, while FIG. 1 illustrates two integer execution units, two floating point execution units, and two load/store units, other embodiments may employ any number of each type of unit, and the number of one type may differ from the number of another type.

Floating Point Approximation

One or both of the floating point units 24A–24B may be configured to use an approximation algorithm to approximate various floating point functions specified by floating point instructions. For example, reciprocals and reciprocal square roots may be approximated. Division may be approximated in a manner similar to reciprocals (with one more step as compared to the reciprocal operation, in which the dividend is multiplied by the reciprocal of the divisor). Any set of functions may be implemented via approximation in various embodiments.

Generally, the floating point units may implement any approximation algorithm. An approximation algorithm may be any algorithm for calculating an approximation of a function using one or more other functions. For example, reciprocals, divisions, and square roots may be approximated using multiplication and addition/subtraction. Generally, the approximation algorithm for a function having one or more operands takes an initial approximation of the function result and the operand(s) of the function as input and generates a more accurate approximation of the function result. The approximation algorithm may be implemented in hardware as one or more iterations through the hardware. The approximation algorithms may, in some cases, be recursive. That is, a first approximation of the function result may be calculated using the approximation algorithm. The first approximation may be input to the approximation algorithm for another pass to generate a second, more accurate approximation. For example, an embodiment described below may use the Newton-Raphson approximation algorithm to approximate reciprocals and reciprocal square roots. The approximation includes a series of multiplications and subtractions, where the subtractions subtract the product of the preceding multiplication from a constant. The subtractions may be approximated by inverting the product and optionally shifting the inverted result depending on the value of the product.

As mentioned above, approximating the subtraction result in this fashion results in an approximated subtraction result which is less than the correct result by one unit in the last place (the least significant bit output by the circuitry used to perform the subtraction). That is, the correct result is the approximated result incremented by one.

To increase the accuracy of the approximation algorithm, a control circuit controlling operation of the floating point unit during performance of the approximation algorithm may generate a correction vector to be incorporated into the next multiplication of the approximation algorithm. The correction vector may correct the approximation of the subtraction result. In one embodiment, the product produced by the multiplier may be the sum of the correction vector and the arithmetic product of the input operands of the multiplier. In one embodiment, the correction vector may be input as part of a rounding vector to the multiplier. In other operations, the rounding vector may be set to perform a designated rounding mode on the arithmetic product.

The floating point instructions (including instructions whose result may be approximated using the approximation algorithm) may be incorporated into programs with other instructions to perform various applications in which floating point number representations are used. For example, various scientific applications may use floating point numbers to represent various physical phenomena. In financial applications, the floating point numbers may represent currency. Any application which uses floating point representations may use the floating point instructions.

Figure 2:
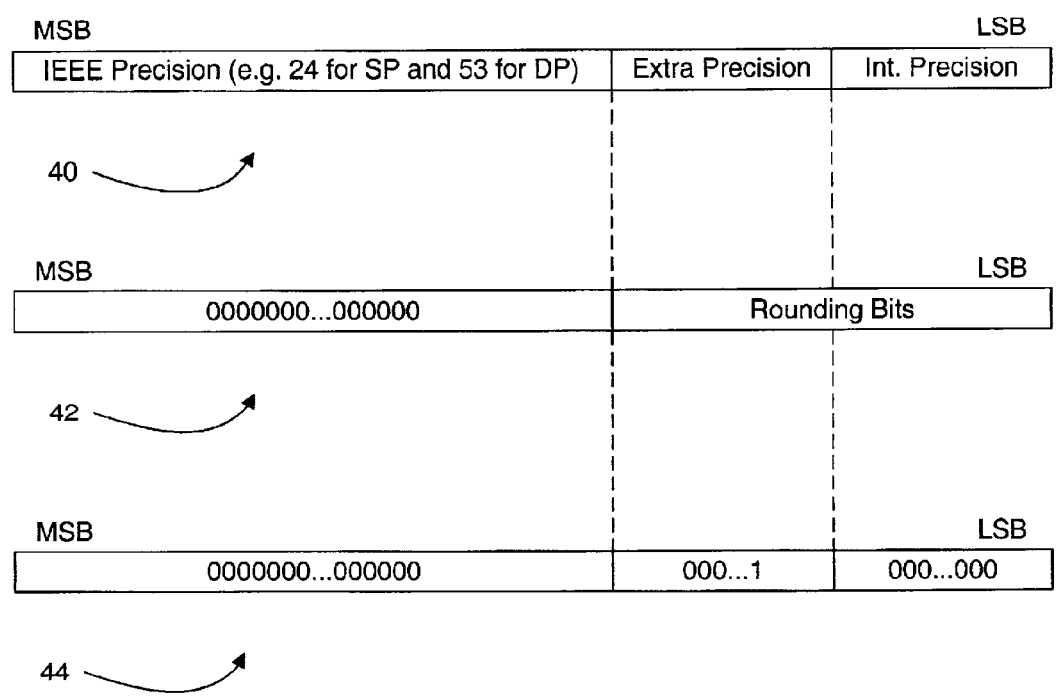
FIG. 2 is a block diagram of one embodiment of a significand, a rounding vector, and a correction vector.

Turning now to FIG. 2, a block diagram is shown illustrating one embodiment of a significand 40, a rounding vector 42, and a correction vector 44 which may be employed by one embodiment of the floating point units 24A–24B. Other embodiments are possible and contemplated. As illustrated in FIG. 2, the most significant bit (MSB) of the values 40, 42, and 44 is shown on the left and the least significant bit is shown on the right.

The significand 40 is divided into three sections in FIG. 2. The most significant section is the IEEE-specified precision for the significand. That is, for a single precision number, the IEEE-specified precision is 24 bits and, for a double precision number, the IEEE-specified precision is 53 bits. The IEEE-specified portion shown in FIG. 2 includes the implicit bit to the left of the binary point, which may not be stored in the floating point registers in the register file 28 in some embodiments, but may be used in the calculations performed by the floating point units 24A–24B.

The next most significant section of the significand 40 after the IEEE-specified precision is the extra precision section. This section comprises one or more extra bits of precision that may be implemented by the floating point unit 24A–24B. That is, the extra bits of precision may be included in the result generated by the floating point unit 24A–24B, and may be used if the result is an intermediate value (e.g. a value to be used in a subsequent iteration of the floating point unit 24A–24B for an approximation algorithm). In one embodiment, 3 extra precision bits may be included for single precision numbers and 7 extra precision bits may be included for double precision numbers. Other embodiments may vary the number of extra precision bits.

The least significant section of the significant 40 is the intermediate precision bits. The intermediate precision bits may be generated within a floating point calculation circuit (e.g. a multiplier) during the operation thereof. For example, the multiplier may be implemented with a partial product generator followed by a carry-save adder (CSA) tree to add the partial products together (shifted based on the binary place that each partial product represents). In such an embodiment, the partial products and sums thereof may include the intermediate precision. The final product may be rounded to the IEEE precision, if rounding is being used.

The rounding vector 42 includes binary zeros in a portion corresponding to the IEEE-specified precision. The remainder of the rounding vector, extending to the LSB of the intermediate precision, may be a set of rounding bits selected according to the rounding mode in effect for a given operation. For example, round to infinity may be accomplished with all the rounding bits being set. Round to nearest may be accomplished by setting the most significant rounding bit (corresponding to the most significant extra precision bit) and clearing the remaining rounding bits.

The correction vector 42 also includes binary zeros in a portion corresponding to the IEEE-specified precision. The correction vector 42 includes an extra precision bits portion corresponding to the extra precision bits portion of the significand 40. The extra precision bits portion includes a binary one in the least significant bit of the extra precision portion and binary zeros in the remaining bits. The portion of the correction vector 42 corresponding to the intermediate precision portion of the significand 40 is also binary zeros.

The correction vector 44 shown in FIG. 2 may be used in the multiplier described above, which generates partial products and adds them in a CSA tree. In such an embodiment, the rounding vector 42 is supplied as an input to one of the CSA's, and is thus added to produce the product output by the multiplier. By supplying the correction vector 44 instead of (or as part of) a rounding vector during a multiplication which uses a subtraction approximation as an input (e.g. a next iteration through the multiplier for an approximation algorithm after an iteration in which a subtraction approximation was made), the subtraction approximation's unit-in-the-last-place inaccuracy may be corrected.

While the present embodiment includes extra precision bits, other embodiments may not include extra precision bits. In such embodiments, the correction vector 44 may include a binary one in the least significant bit of the IEEE-specified portion and binary zeros elsewhere. Additionally, if the multiplier has a construction that does not sum partial products, the correction vector may differ. Generally, the correction vector may be generated such that, when incorporated into the multiplication operation of the multiplier, it corrects the error in the subtraction approximation.

It is noted that, while the IEEE-specified precisions are used as examples herein, any precision may be used.

Figure 3:
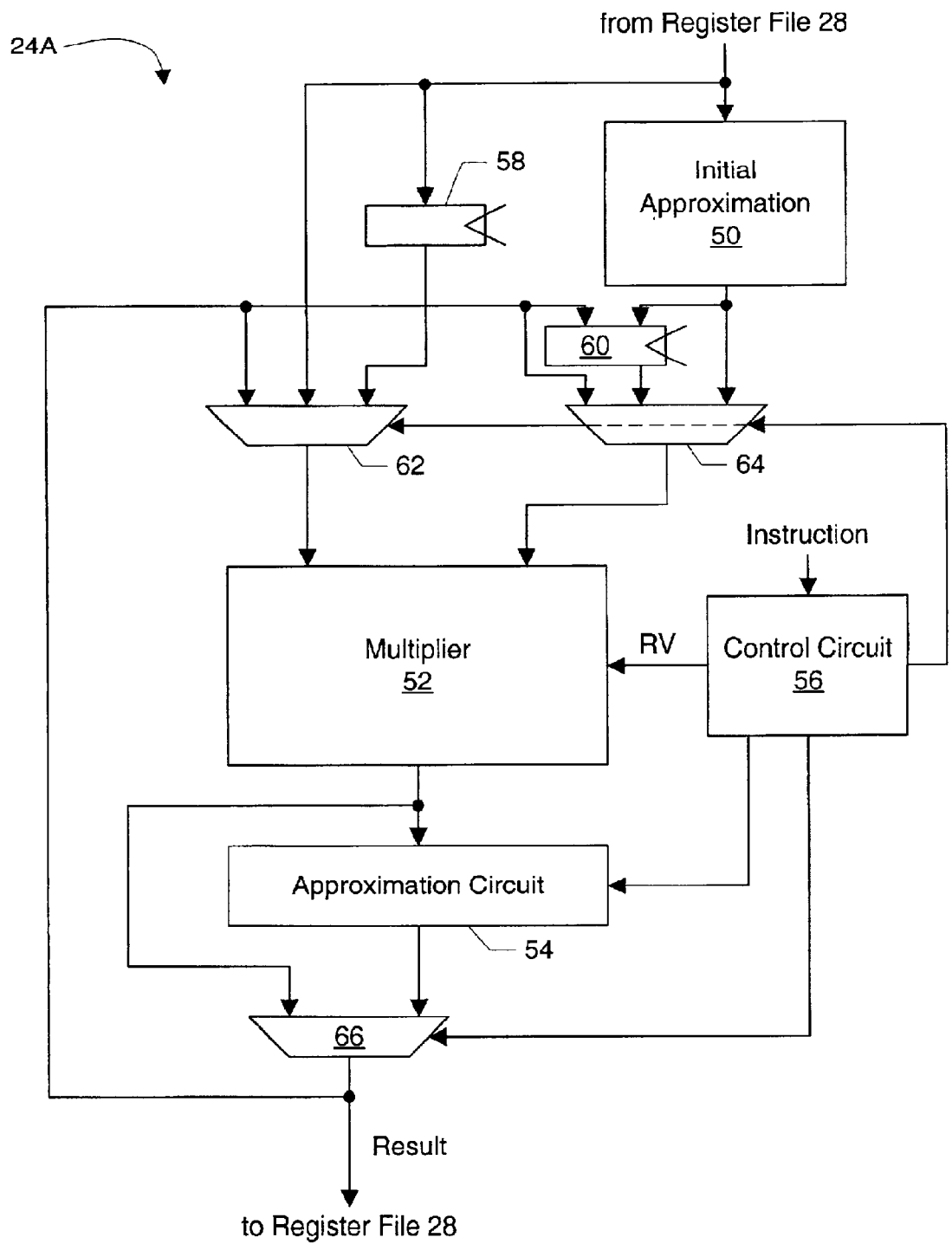
FIG. 3 is a block diagram of one embodiment of a portion of a floating point unit.

Turning now to FIG. 3, a block diagram of a portion of one embodiment of the floating point unit 24A is shown. The floating point unit 24B may include a similar portion. Other embodiments are possible and contemplated. In the embodiment of FIG. 3, the portion of the floating point unit 24A includes an initial approximation circuit 50, a multiplier 52, an approximation circuit 54, a control circuit 56, registers 58 and 60, operand multiplexors (muxes) 62 and 64, and an output mux 66. The initial approximation circuit 50 is coupled to receive an operand of a floating point instruction to be executed by the floating point unit 24A, and is coupled to the register 60 and the operand mux 64. The register 58 and the operand mux 62 are also coupled to receive the operand. The operand mux 62 is further coupled to the register 58 and the output mux 66, and is coupled to the multiplier 52. The operand mux 64 is further coupled to the register 60, the output mux 66, and the multiplier 52. Each of the muxes 62, 64, and 66 is coupled to receive a selection control from the control circuit 56. The control circuit 56 is coupled to supply a rounding vector (RV) to the multiplier 52. The multiplier 52 is coupled to the approximation circuit 54 and the output mux 66. The output mux 66 is further coupled to the approximation circuit 54. The output mux 66 is coupled to provide a result to the register file 28. The control circuit 56 is coupled to receive the floating point instruction to be executed, or an indication thereof.

The portion of the floating point unit 24A may be used to implement an approximation algorithm. The Newton-Raphson algorithm is used for the examples described herein with regard to FIGS. 4–7, but any algorithm may be used.

In response to the instruction being dispatched to the floating point unit 24A, the initial approximation circuit 50 provides an initial approximation of the result based on the operand of the instruction (received from the register file 28). The initial approximation circuit 50 may include a table in which a set of initial approximations may be stored. The stored initial approximations may correspond to various possible operand values spread across a predetermined range. In one embodiment, two or more initial approximations (which correspond to operand values represented in the table which are both greater than and less than the actual operand value) may be read from the table based on the actual operand value. The initial approximations read from the table may be interpolated (e.g. linearly interpolated) to provide the initial approximation output from the initial approximation circuit 50. The initial approximation is an input to the first pass of the approximation algorithm (which may involve multiple iterations through the hardware shown in FIG. 3) to produce a first approximation of the result. Additional passes of the approximation algorithm may optionally be performed, using the approximation calculated in the previous pass, to generate more accurate approximations.

The initial approximation is input to the operand mux 64, and is also captured in the register 60. The initial approximation may be provided from the register 60 during subsequent iterations of the first pass, depending on the function being approximated and on the approximation algorithm. The operand value may also be input to the operand mux 62, and may be captured in the register 58 to be used for subsequent iterations or subsequent passes of the approximation algorithm, depending on the function being approximated and the algorithm. The control circuit 56 may select the operand value and the initial approximation through the operand muxes 62 and 64, respectively, for the first iteration of the first pass of the approximation algorithm. In other iterations, the result supplied by the output mux 66 may be selected through one or the other of the operand muxes 62 and 64 during a given iteration.

The multiplier 52 multiplies the operands supplied by the operand muxes 62 and 64 to produce a product. The product may have the intermediate precision (e.g. the precision including all three fields shown in FIG. 2, for an embodiment implementing the significand 40). The control circuit 56 may supply a rounding vector (RV in FIG. 3) based on the rounding mode in effect for the instruction to round the product to the IEEE-specified precision if the product is a result to be stored in the register file 28. Alternatively, the control circuit 56 may supply a correction vector (or a combination of the correction vector and a rounding vector) during approximation iterations, to correct for the approximation error of the approximation circuit 54 from a previous iteration. In either case, the multiplier 52 may output the product having the extra precision bits (if implemented), in addition to the IEEE-specified precision bits.

In one embodiment, the multiplier may comprise a partial product generator and a CSA tree. The partial product generator generates a set of partial products from the operands. The product is the sum of the partial products, shifted to account for which binary place that the partial product represents. The CSA tree may be used to add the partial products. An additional input to the CSA tree may be the rounding vector or the correction vector.

The product output by the multiplier 52 is input to the approximation circuit 54 and to the output mux 66. The control circuit 56 may select one of the product or the output of the approximation circuit 54 depending on whether the operation approximated by the approximation circuit 54 is used in the current iteration. For example, in one embodiment, the approximation circuit 54 may approximate the difference between the product and a constant by inverting the product and, depending on the magnitude of the product and the difference being approximated, optionally right shifting or left shifting the inverted product.

The output mux 66 outputs either the product or the approximation generated by the approximation circuit 54. The output may be forwarded as a result of the instruction, if the approximation algorithm is complete, and may be forwarded back to operand muxes 62 and 64 for use in subsequent iterations of the approximation algorithm. If the result is a completion of a pass in the approximation algorithm and is to be input to the next pass of a recursive approximation algorithm, the result may be selected through the operand mux 64 and captured in the register 60. If the result is a result of an iteration, the result may be selected through the operand mux 62 for further multiplication.

It is noted that the floating point unit 24A may include additional hardware, as desired. For example, the floating point unit 24A may include circuitry for calculating the exponent of the result, a normalizer for normalizing the result, adder circuitry for performing a floating point add, etc. Additionally, the multiplier 52 may be used for other purposes as well (e.g. for a floating point multiply instruction or multimedia vector operation). There may be additional inputs to the operand muxes 62 and/or 64 for such embodiments. It is further noted that, while the operand from the register file 28 and the initial approximation are provided directly through the operand muxes 62 and 64, respectively, as well as being registered in registers 58 and 60, other embodiments may only provide the outputs of the registers 58 and 60 to the muxes 62 and 64 (i.e. the initial approximation may be a separate pipeline stage).

Figure 4:
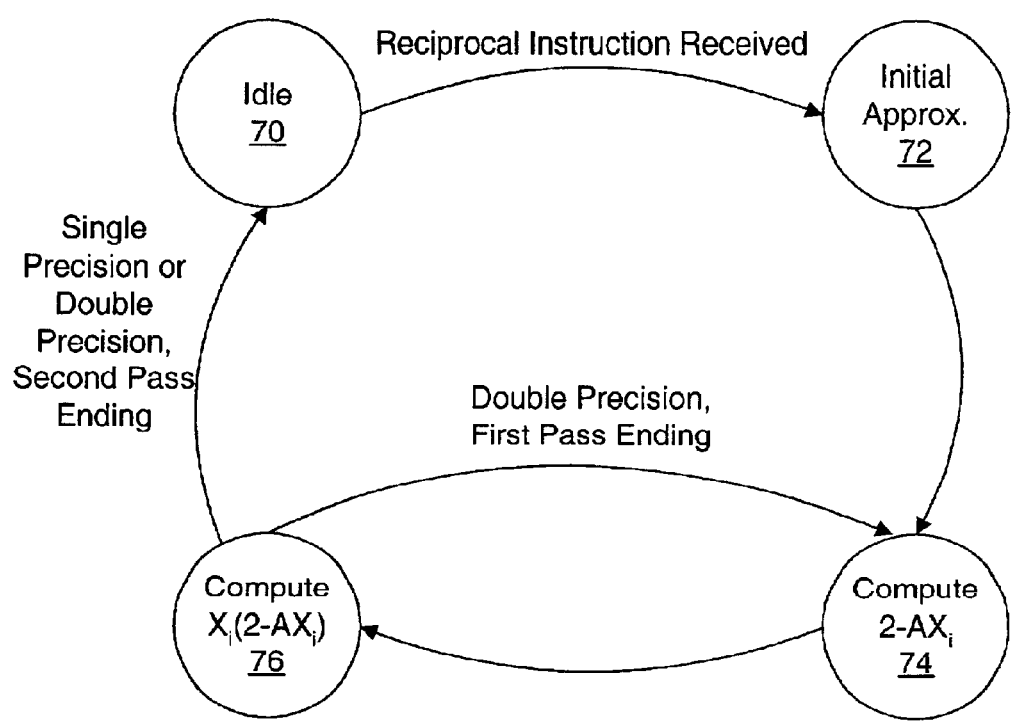
FIG. 4 is a state machine which may be implemented by one embodiment of a control circuit shown in FIG. 3 to approximate a reciprocal.

FIGS. 4 and 5 illustrate a first example of the use of the hardware shown in FIG. 3 to approximate a function. In this example, the reciprocal function is being approximated using the Newton-Raphson approximation algorithm. The formula for the Newton-Raphson approximation of the reciprocal of A (where A is the operand of the instruction) is:

$$X_{i-1}=X_i(2-AX_i)$$

The formula may be recursively calculated (using each approximation as the input to generate the next approximation) until a sufficiently accurate X has been calculated. In one embodiment, $X_0$ is the initial approximation generated by the initial approximation circuit 50, and may include about 15 bits of precision. $X_1$ may be used as the result of the approximation algorithm (e.g. one pass of the approximation algorithm may be performed) for single precision operation and $X_2$ may be used (e.g. two passes of the approximation algorithm may be performed) as the result for a double precision operation. Other embodiments may use more passes for each case, as desired.

FIG. 4 is an exemplary state machine for one embodiment of the control circuit 56 for performing the reciprocal approximation. Other embodiments are possible and contemplated. In the embodiment of FIG. 4, the state machine includes an idle state 70, an initial approximation state 72, a Compute $2-AX_i$ state 74, and a Compute $X_i(2-AX_i)$ state 76. FIG. 5 is a table illustrating the various states of the state machine shown in FIG. 4 and the operation of the control circuit 56 in controlling the operand muxes 62 and 64 and the output mux 66. Additionally, FIG. 5 illustrates the rounding vector supplied by the control circuit 56 to the multiplier 52.

The control circuit 56 may be in the idle state 70 if the control circuit 56 is not currently processing an instruction. The controls for the muxes 62, 64, and 66 and the rounding vector may be don't care's in this case (illustrated as "—" in the table of FIG. 5). In response to receiving a reciprocal instruction, the control circuit 56 may change to the initial approximation state 72.

In the initial approximation state 72, the initial approximation circuit 50 may generate the initial approximation of the reciprocal function. The controls for the muxes 62, 64, and 66 and the rounding vector may be don't care's in this case (illustrated as "—" in the table of FIG. 5). In some embodiments, the muxes 62 and 64 may be pipelined in the approximation stage (or the last stage of multiple stages, if applicable), in which case the muxes 62 and 64 may be controlled in the initial approximation state 72 in a manner similar to that shown for the Compute $2-AX_i$ state 74. In response to the initial approximation being computed, the control circuit 56 may change to the Compute $2-AX_i$ state 74.

In the Compute $2-AX_i$ state 74, the multiplier 52 computes the product $AX_i$. The operand from the register file is A in the first pass (selected through mux 62, "Input Operand" as shown in FIG. 5), and $X_i$ is the initial approximation in the first pass (selected through mux 64, "Approx." as shown in FIG. 5). For other passes, the operand A is selected from the register 58 through the mux 62 ("Register" as shown in FIG. 5) and the result from the previous pass, which is the most recently generated approximation $X_i$, is selected through mux 64 ("Result" in FIG. 5).

Since $X_i$ is an approximation of the reciprocal of A, the product $AX_i$ is approximately one and $2-AX_i$ is also approximately one. The approximation circuit 54 is used to approximate $2-AX_i$ (that is, the difference of 2 and the product from the multiplier) by inverting the product $AX_i$. In this case, it can be shown that if the product $AX_i$ is less than one, the inverted product is left-shifted by one bit to provide the approximation. If the product $AX_i$ is greater than one, the inverted product is the approximation of $2-AX_i$. The control circuit 56 selects the output of the approximation circuit 54 via the output mux 66 (as shown in FIG. 5). The rounding vector may be set to the desired rounding mode (e.g. round to nearest in this embodiment). In one implementation, the round to nearest performed during iterations other than a final result may round to the extra precision (e.g. round to nearest may include the most significant bit of the internal precision bits being set to round to the nearest extra precision value). In response to completing the iteration through the multiplier 52 and the approximation circuit 54, the control circuit 56 may change to the Compute $X_i(2-AX_i)$ state 76.

In the Compute $X_i(2-AX_i)$ state 76, the multiplier computes the product $X_i(2-AX_i)$. The control circuit 56 selects the result from the previous iteration $(2-AX_i)$ through the operand mux 62 ("Result" in FIG. 5) and selects the initial approximation (for the first pass, stored in the register 60) or the approximation from the previous pass (for other passes, where the approximation from the previous pass is also stored in the register 60) through the operand mux 64 ("Register" in FIG. 5). Since this state is computing a product only (no difference), the control circuit 56 selects the output of the multiplier 52 through the output mux 66. Additionally, since the previous iteration included an approximation of a difference, the control circuit 56 generates a correction vector on the rounding vector input of the multiplier 52. More particularly, in this embodiment, the rounding vector input may be the combination of the correction vector and the rounding vector (e.g. round to nearest). In one implementation, the rounding vector may be the logical OR of the correction vector and the round to nearest vector (i.e. the least significant bit of the extra precision bits may be set and the most significant bit of the internal precision bits may be set).

From the Compute $X_i(2-AX_i)$ state 76, the control circuit 56 may transition to either the Compute $2-AX_i$ state 74 for a second pass, if double precision is being used and the first pass is ending, or may transition to the idle state 70, if single precision is being used or the second pass of a double precision approximation is ending. If the transition to the Compute $2-AX_i$ state 74 is performed, the control circuit 56 may also cause the register 60 to capture the approximation result from the first pass.

The states 74 and 76 shown in FIG. 4 may each represent an iteration through the multiplier 52 and optionally the approximation circuit 54. Accordingly, in embodiments in which the multiplier 52 and/or the approximation circuit 54 are pipelined over two or more clock cycles, the state machine may remain in each of the states 74 and 76 for a number of clock cycles comprising an iteration through the multiplier 52 and/or the approximation circuit 54. Similarly, the state 72 may represent operation in the initial approximation circuit 50. If the operation is pipelined over two or more clock cycles, the state machine may remain in the state 72 for the one or more clock cycles.

It is noted that the state machine shown in FIG. 4 implements a reciprocal approximation (1/A, where A is the input operand). Division may be approximated in a similar fashion (B/A, where B and A are input operands) by adding one more multiplication which multiplies the final approximation of the reciprocal by B.

Figure 6:
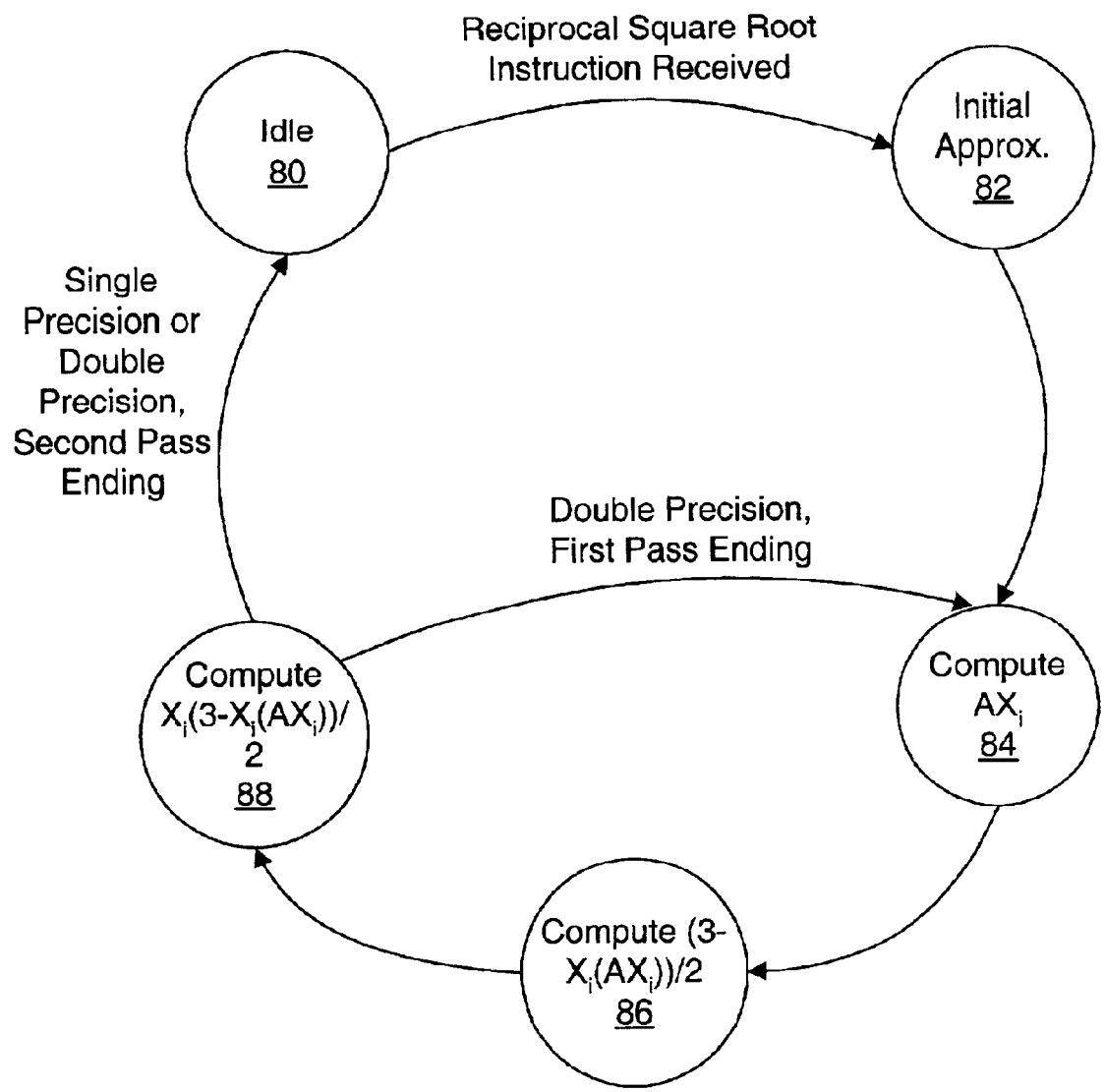
FIG. 6 is a state machine which may be implemented by one embodiment of a control circuit shown in FIG. 3 to approximate a reciprocal square root.

FIGS. 6 and 7 illustrate a second example of the use of the hardware shown in FIG. 3 to approximate a function. In this example, the reciprocal square root function is being approximated using the Newton-Raphson approximation algorithm. The formula for the Newton-Raphson approximation of the reciprocal square root of A (where A is the operand of the instruction) is:

$$X_{i+1}=X_i(3-X_i(AX_i))/2$$

The formula may be recursively calculated (using each approximation as the input to generate the next approximation) until a sufficiently accurate X has been calculated. In one embodiment, $X_0$ is the initial approximation generated by the initial approximation circuit 50, and may include about 15 bits of precision. $X_1$ may be used as the result of the approximation algorithm (e.g. one pass of the approximation algorithm may be performed) for single precision operation and $X_2$ may be used (e.g. two passes of the approximation algorithm may be performed) as the result for a double precision operation. Other embodiments may use more passes for each case, as desired.

FIG. 6 is an exemplary state machine for one embodiment of the control circuit 56 for performing the reciprocal square root approximation. Other embodiments are possible and contemplated. In the embodiment of FIG. 6, the state machine includes an idle state 80, an initial approximation state 82, a Compute $AX_i$ state 84, a Compute $(3-X_i(AX_i))/2$ state 86, and a Compute $X_i(3-X_i(AX_i))/2$ state 88. FIG. 7 is a table illustrating the various states of the state machine shown in FIG. 6 and the operation of the control circuit 56 in controlling the operand muxes 62 and 64 and the output mux 66. Additionally, FIG. 7 illustrates the rounding vector supplied by the control circuit 56 to the multiplier 52.

The idle state 80 and the initial approximation state 82 may be similar to the idle state 70 and the initial approximation state 72 described above, except that the table of initial approximations stores initial approximations of the reciprocal square root rather than the reciprocal. In one embodiment, these states may be shared between the state machines shown in FIGS. 4 and 6. Alternatively, separate state machines may be employed.

In the Compute $AX_i$ state 84, the multiplier 52 computes the product $AX_i$. The operand from the register file is A in the first pass (selected through mux 62, "Input Operand" as shown in FIG. 7), and $X_i$ is the initial approximation in the first pass (selected through mux 64, "Approx." as shown in FIG. 7). For other passes, the operand A is selected from the register 58 through the mux 62 ("Register" as shown in FIG. 7) and the result from the previous pass, which is the most recently generated approximation $X_i$, is selected through mux 64 ("Result" in FIG. 7). The control circuit 56 selects the output of the multiplier through the output mux 66. The rounding vector may be the round to nearest vector, in this embodiment. In response to completing the iteration through the multiplier 52, the control circuit 56 may change to the Compute $(3-X_i(AXi))/2$ state 86.

In the Compute $(3-X_i(AXi))/2$ state 86, the multiplier computes the product $X_i(AX_i)$. The control circuit 56 selects the result from the previous iteration $(AX_i)$ through the operand mux 62 ("Result" in FIG. 7) and selects the initial approximation (for the first pass, stored in the register 60) or the approximation from the previous pass (for other passes, where the approximation from the previous pass is also stored in the register 60) through the operand mux 64 ("Register" in FIG. 7). It is noted that the divide by two portion of the approximation may be handled during the generation of the exponent for the floating point result (not shown in FIG. 3).

Since $X_i$ is an approximation of the reciprocal square root of A, the product $X_i(AX_i)$ is approximately 1. Thus the difference $(3-X_i(AX_i))$ is approximately 2. The approximation circuit 54 is used to approximate this difference by inverting the product $X_i(AX_i)$. In this case, it can be shown that if the product $X_i(AX_i)$ is less than one, the inverted product is right shifted by two bits to provide the approximation. If the product $X_i(AX_i)$ is greater than one, the inverted product is the approximation of the above difference. The control circuit 56 selects the output of the approximation circuit 54 via the output mux 66 (as shown in FIG. 7). Also, the rounding vector may be the round to nearest vector. In response to completing the iteration through the multiplier 52 and the approximation circuit 54, the control circuit 56 may change to the Compute $X_i(3-X_i(AXi))/2$ state 88.

In the Compute $X_i(3-X_i(AXi))/2$ state 88, the multiplier 52 computes the product $X_i(3-X_i(AXi))/2$. The control circuit 56 selects the result from the previous iteration $((3-X_i(AXi))/2)$ through the operand mux 62 ("Result" in FIG. 7) and the initial approximation (for the first pass, stored in the register 60) or the approximation from the previous pass (for other passes, where the approximation from the previous pass is also stored in the register 60) through the operand mux 64 ("Register" in FIG. 7). Since this state does not also compute a difference, the control circuit 56 selects the output of the multiplier 52 as the output through the output mux 66. Additionally, since the previous iteration included an approximation of a difference, the control circuit 56 generates a correction vector on the rounding vector input of the multiplier 52. More particularly, the rounding vector input may receive the combination of the correction vector and the round to nearest vector, in this embodiment.

From the Compute $X_i(3-X_i(AXi))/2$ state 88, the control circuit 56 may transition to either the Compute $AX_i$ state 84 for a second pass, if double precision is being used and the first pass is ending, or may transition to the idle state 80, if single precision is being used or the second pass of a double precision approximation is ending. If the transition to the Compute $AX_i$ state 84 is performed, the control circuit 56 may also cause the register 60 to capture the approximation result from the first pass.

The states 84, 86, and 88 shown in FIG. 6 may each represent an iteration through the multiplier 52 and optionally the approximation circuit 54. Accordingly, in embodiments in which the multiplier 52 and/or the approximation circuit 54 are pipelined over two or more clock cycles, the state machine may remain in each of the states 84, 86, and 88 for a number of clock cycles comprising an iteration through the multiplier 52 and/or the approximation circuit 54. Similarly, the state 82 may represent operation in the initial approximation circuit 50. If the operation is pipelined over two or more clock cycles, the state machine may remain in the state 82 for the one or more clock cycles.

It is noted that, while the state machines shown in FIGS. 4 and 6 implement one pass of the approximation algorithm for single precision and two passes for double precision, other embodiments may use more passes for either precision, as desired.

Figure 8:
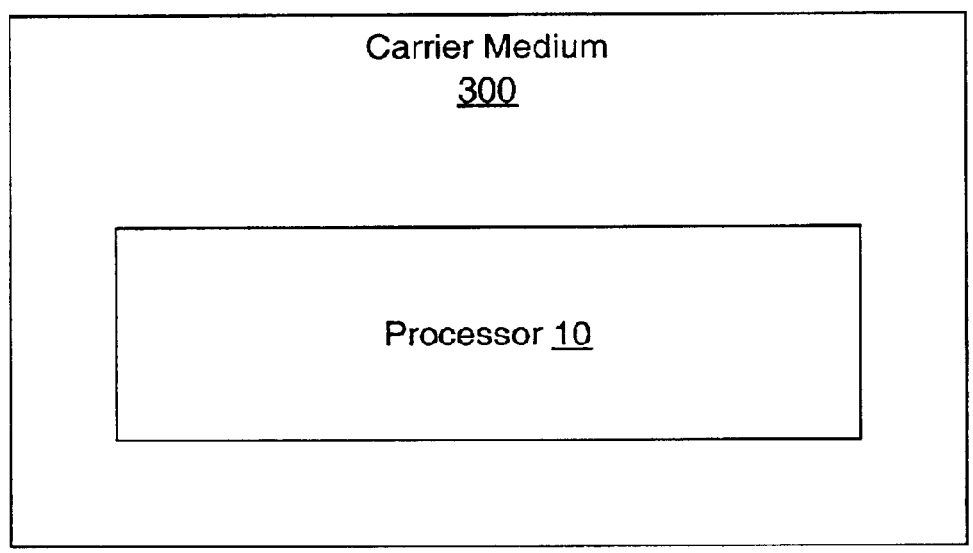
FIG. 8 is a block diagram of a carrier medium.

Turning next to FIG. 8, a block diagram of a carrier medium 300 including one or more data structures representative of the processor 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the data structure(s) of the processor 10 carried on carrier medium 300 may be read by a program and used, directly or indirectly, to fabricate the hardware comprising the processor 10. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the processor 10. The netlist(s) may then be placed and routed to produce one or more data set(s) describing geometric shapes to be applied to masks. The masks may then be used in various semiconductor fabrication steps to produce a semiconductor circuit or circuits corresponding to the processor 10. Alternatively, the data structure(s) on carrier medium 300 may be the netlist(s) (with or without the synthesis library) or the data set(s), as desired.

While carrier medium 300 carries a representation of the processor 10, other embodiments may carry a representation of any portion of processor 10, as desired, including one or more of: a floating point unit or units 24A–24B, an initial approximation circuit 50, a multiplier 52, an approximation circuit 54, a control circuit 56, registers 58 and 60, muxes 62, 64, and 66, etc.

Numerous variations and modifications will become apparent to those skilled in the art once the above disclosure is fully appreciated. It is intended that the following claims be interpreted to embrace all such variations and modifications.

What is claimed is:

1. A floating point unit comprising:
   a multiplier configured to generate a first result;
   an approximation circuit coupled to receive the first result and configured to generate an approximation of a difference of the first result from a constant; and
   a control circuit coupled to the multiplier and the approximation circuit, wherein the control circuit is configured to approximate a function specified by a floating point instruction provided to the floating point unit for execution using an approximation algorithm, the approximation algorithm comprising at least two iterations through the multiplier and optionally the approximation circuit, wherein the control circuit is configured to correct the approximation from the approximation circuit from a first iteration of the approximation algorithm during a second iteration of the approximation algorithm by supplying a correction vector to the multiplier during the second iteration;
   wherein the multiplier is configured to incorporate the correction vector into the first result during the second iteration.

2. The floating point unit as recited in claim 1 wherein the multiplier is coupled to receive at least two operands, and wherein the first result of the multiplier comprises a sum of the correction vector and a product of the operands.

3. The floating point unit as recited in claim 2 wherein the approximation is less than the difference by one unit in the least significant bit of the approximation.

4. The floating point unit as recited in claim 3 wherein the correction vector comprises binary zeros except for a binary one in a location corresponding to the least significant bit of the approximation.

5. The floating point unit as recited in claim 4 wherein the approximation includes one or more extra precision bits in addition to a precision specified by a floating point standard, and wherein the least significant bit of the approximation is a least significant bit of the extra precision bits.

6. The floating point unit as recited in claim 1 wherein the approximation circuit is configured to generate the approximation by inverting the first result and optionally shifting the inverted first result.

7. The floating point unit as recited in claim 1 wherein the approximation algorithm is recursive.

8. The floating point unit as recited in claim 7 wherein the approximation algorithm is the Newton-Raphson algorithm.

9. The floating point unit as recited in claim 1 wherein the correction vector is input on a rounding vector input of the multiplier, and wherein the control circuit is configured to transmit a rounding vector on the rounding vector input in response to an operation for which rounding is specified.

10. A method comprising:
    approximating a function using an approximation algorithm comprising at least two iterations of: (i) a multiplication in a multiplier, and (ii) a difference approximation between a constant and a result of the multiplication, wherein the difference approximation is less than a difference between the constant and the result by one unit in the least significant bit of the difference approximation;
    during a first of the iterations, generating the difference approximation; and
    during a second of the iterations, supplying a correction vector to the multiplier, the multiplier incorporating the correction vector in the multiplication, the correction vector correcting the difference approximation.

11. The method as recited in claim 10 wherein a result of the multiplication comprises a sum of the correction vector and a product of at least two operands of the multiplication.

12. The method as recited in claim 11 wherein the correction vector comprises binary zeros except for a binary one in a location corresponding to the least significant bit of the difference approximation.

13. The method as recited in claim 12 wherein the difference approximation includes one or more extra precision bits in addition to a precision specified by a floating point standard, and wherein the least significant bit approximation is a least significant bit of the extra precision bits.

14. The method as recited in claim 10 wherein the approximation algorithm is recursive.

15. The method as recited in claim 14 wherein the approximation algorithm is the Newton-Raphson algorithm.

16. A computer readable storage medium comprising one or more data structures to fabricate a floating point unit, in which the floating point unit includes:
    a multiplier configured to generate a first result;
    an approximation circuit coupled to receive the first result and configured to generate an approximation of a difference of the first result from a constant; and
    a control circuit coupled to the multiplier and the approximation circuit, wherein the control circuit is configured to approximate a function specified by a floating point instruction provided to the floating point unit for execution using an approximation algorithm, the approximation algorithm comprising at least two iterations through the multiplier and optionally the approximation circuit, wherein the control circuit is configured to correct the approximation from the approximation circuit from a first iteration of the approximation algorithm during a second iteration of the approximation algorithm by supplying a correction vector to the multiplier during the second iteration;

wherein the multiplier is configured to incorporate the correction vector into the first result during the second iteration.

17. The computer readable storage medium as recited in claim 16 wherein the multiplier is coupled to receive at least two operands, and wherein the first result of the multiplier comprises a sum of the correction vector and a product of the operands.

18. The computer readable storage medium as recited in claim 17 wherein the approximation is less than the difference by one unit in the least significant bit of the approximation.

19. The computer readable storage medium as recited in claim 18 wherein the correction vector comprises binary zeros except for a binary one in a location corresponding to the least significant bit of the approximation.

20. The computer readable storage medium as recited in claim 19 wherein the approximation includes one or more extra precision bits in addition to a precision specified by a floating point standard, and wherein the least significant bit of the approximation is a least significant bit of the extra precision bits.

21. The computer readable storage medium as recited in claim 16 wherein the approximation circuit is configured to generate the approximation by inverting the first result and optionally shifting the inverted first result.

22. The computer readable storage medium as recited in claim 16 wherein the approximation algorithm is recursive.

23. The computer readable storage medium as recited in claim 22 wherein the approximation algorithm is the Newton-Raphson algorithm.

* * * * *